United States Patent [19]

Evans et al.

[11] 4,441,062
[45] Apr. 3, 1984

[54] MISSING PULSE DETECTOR FOR A SYNCHRONOUS MOTOR DRIVE

[75] Inventors: William E. Evans; Jimmie D. Gillett, both of Garland, Tex.

[73] Assignee: Varo, Inc., Garland, Tex.

[21] Appl. No.: 343,749

[22] Filed: Jan. 29, 1982

[51] Int. Cl.$^3$ .............................................. H02P 3/18
[52] U.S. Cl. .................................... 318/703; 318/314; 318/757
[58] Field of Search .............. 318/702, 314, 318, 703, 318/757

[56] References Cited

U.S. PATENT DOCUMENTS

| | | | |
|---|---|---|---|
| 3,458,823 | 7/1969 | Nordahl | 328/110 |
| 4,042,873 | 8/1977 | Cox | 363/129 |
| 4,047,231 | 9/1977 | Gargnon | 360/70 |

Primary Examiner—David Smith, Jr.
Attorney, Agent, or Firm—Jerry W. Mills; Gregory M. Howison; Nina Medlock

[57] ABSTRACT

A missing pulse detector circuit is disclosed which includes a variable frequency VCO and a digital phase comparator. The phase comparator compares the phase of the VCO reference and the phase of a driving signal that drives a synchronous motor drive package. The output of the phase comparator is input to a loop filter to provide an error signal that controls the VCO frequency and phase. A second output on the phase comparator translates a phase difference into a pulse width. The pulse width is then input to an integrator circuit to delay the leading edge thereof. This delayed pulse is then input to a Schmidt trigger which provides a switching threshold. The output of the Schmidt trigger is utilized to inhibit the operation of a synchronous motor in the motor drive package. The missing pulse detector is operable to detect rapid increases in acceleration of the driving frequency and added or deleted pulses therein. When either of these conditions is present, an inhibit signal removes the drive from the synchronous motor and a restart procedure is initiated.

15 Claims, 3 Drawing Figures

MISSING PULSE DETECTOR FOR A SYNCHRONOUS MOTOR DRIVE

TECHNICAL FIELD

The present invention pertains to missing pulse detectors and more particularly to a missing pulse detector for a synchronous motor drive.

BACKGROUND OF THE INVENTION

The significant and distinguishing feature of synchronous motors in contrast to induction motors is that they are doubly excited. Electrical energy is supplied to both the field and the windings. When this is done, torque can be developed at only one speed—the synchronous speed. At any other speed the average torque is zero.

In three phase synchronous motors, the frequency of each phase is synchronized with the speed of the motor, that is, for a given line frequency there is a given synchronous speed. When, for some reason, the speed of the motor is not synchronized to the line of frequency, the speed—torque curve of the motor is disrupted. This results in a large current being passed through the motor without developing torque, therefore resulting in high dissipation. Under this condition, it is necessary to stop the motor and go through a restart-up procedure. This restart-up procedure consists of slowly increasing the line speed to track the motor speed until the proper motor speed is obtained.

One way in which an unsynchronized pulse can be injected across one of the phase terminals of the synchronous motor is from a line transient. Line transients can introduce unwanted pulses in the switching circuits that drive the synchronous motor. These switching transients can cause unwanted motor perturbations that require the motor to be shut down and restart. Another way that the motor can become unsynchronized is too rapid an acceleration. This results when the input line frequency is increased faster than the motor speed resulting in a high "slew" rate. Synchronous motors can tolerate a small slew rate of 1 to 2% but any greater slew rate could damage the motor.

To detect the addition of transients or high acceleration, missing pulse detectors have been utilized. These missing pulse detectors are of the type RC555 manufactured by Raytheon Company and described on page 7-4 of the Linear Integrated Circuit Data Book (1978). The device is configured such that the timing cycle is continuously reset by an input pulse train. A change in frequency, or a missing pulse, allows the timing cycle to go to completion and change the output level. This circuit has disadvantages in that it only runs at a single frequency.

In view of the above problems, there exists a need for a missing pulse detector that is operable over a wide input frequency range and compensates for both transients and excessive acceleration.

SUMMARY OF THE INVENTION

The present invention disclosed and claimed herein comprises a method for detecting excessive acceleration and missing pulses in a synchronous motor. The method includes the following steps. An input signal having a frequency corresponding to the synchronous speed of the motor is received. A variable frequency reference signal is generated and the phase and frequency thereof are adjusted to provide a constant phase difference between the reference signal and the input signal. The phase of the input signal is compared to the phase of the reference signal to provide a phase difference signal. This phase difference signal is sampled after a predetermined duration of time to provide an output signal when the phase difference deviates from the constant phase difference. The presence of the output signal indicates an excessive acceleration when the phase deviates in one direction and a missing pulse when the phase deviates in the opposite direction.

In accordance with another aspect of the invention a circuit for detecting excessive acceleration and missing pulses in a synchronous motor is provided. The circuit includes a frequency generator for generating the variable frequency reference signal and a circuit for adjusting the phase and frequency of the reference signal to provide the constant phase difference between the reference signal and the input signal. A comparator is provided for comparing the phase of the input signal and the reference signal to provide the phase difference signal. A circuit for sampling the difference signal after the predetermined duration of time provides the output signal.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
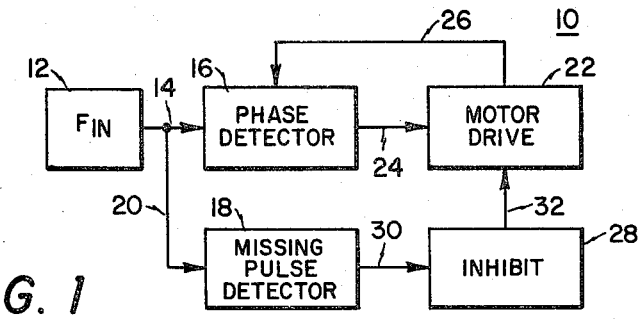
FIG. 1 is a block diagram of a motor drive package.

Referring to FIG. 1, there is shown a block diagram of a motor drive package 10 utilizing the present invention. A frequency reference 12 outputs a driving frequency $F_{IN}$ on a signal line 14. The frequency $F_{IN}$ output by the frequency reference 12 is input to one input of a phase detector 16. The frequency $F_{IN}$ output by the frequency reference 12 is also input to a missing pulse detector 18 along a signal line 20.

The output of the phase detector 16 is input to a motor drive package 22 along a signal line 24. A feedback signal from the motor drive package 22 is input to the phase detector 16 along a signal line 26. The output of the missing pulse detector is input to an inhibit circuit 28 along a signal line 30. The output of the inhibit circuit is input to the motor drive package 22 along a signal line 32.

The motor drive package 22 consists of a synchronous motor, driving circuitry and motor speed sensing circuitry. A control signal is received along the signal line 24 to establish the driving frequency for the synchronous motor within the motor drive package 22. The motor speed is sensed internally and fed back along the line 26 to the phase detector 16. The phase detector 16 compares the phase of the signal on the line 14 and the signal on the line 26 and outputs an error signal on the line 24. The system is similar to the conventional phase lock loop.

When the frequency of the frequency source 12 changes, a difference of phase is generated between the signals on the line 26 and the line 14 input to the phase detector 16. This results in a larger error signal on the line 24, thus causing the synchronous motor within the motor drive package 22 to change speed also. The speed of the motor changes until the proper phase relation between the signals on the lines 26 and 14 is present.

The missing pulse detector 18 also receives the same signal $F_{IN}$ that the phase detector 16 receives. The missing pulse detector 18 is operable to determine both the rate at which the frequency $F_{IN}$ of the frequency source 12 is changing and to detect either a missing pulse or an additional pulse. If the frequency $F_{IN}$ increases or decreases too rapidly, the synchronous motor in the motor drive package 22 may lag the change in the frequency $F_{IN}$. This lag or "slew" rate is intolerable for synchronous motors and can result in motor damage. It is therefore necessary to detect any unwanted changes in frequency $F_{IN}$ and shut the motor drive package 22 down and go through a restart-up procedure.

In some circumstances, noise or transients can be present on the control circuitry for the frequency source 12. These transients introduce unwanted pulses or cause deletion of already present pulses in the signal $F_{IN}$. This perturbation in the pulses on $F_{IN}$ causes an error voltage to be generated on the line 24. This error voltage indicates to the motor drive package 22 that the speed of the synchronous motor therein is incorrect. The motor drive package 22 then attempts to correct this condition by changing the speed of the motor. Since this is an incorrect change, it can result in a false signal to the synchronous motor, thus resulting in either high currents or motor failure. The missing pulse detector 18 therefore provides an indication of the condition of the driving frequency $F_{IN}$ of the frequency source 12 that controls the speed of the synchronous motor in the motor drive package 22.

Figure 2:
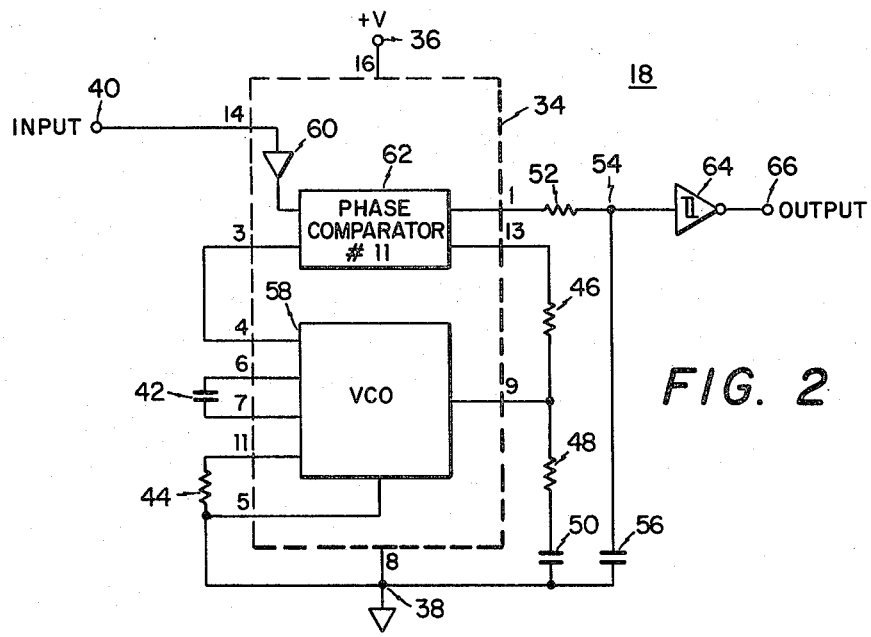
FIG. 2 is a schematic diagram of the circuit for the missing pulse detector.

Referring now to FIG. 2, there is shown a schematic diagram for the missing pulse detector 18 of FIG. 1. The circuit within the dashed lines is a conventional phase lock loop Integrated Circuit 34 (PLL) of the type CD4046B manufactured by RCA Solid State.

The PLL IC 34 has pin 16 thereof connected to a positive voltage terminal 36 and pin 8 thereof are connected to a ground terminal 38. Pin 14 of the PLL IC 34 is connected to an input terminal 40 and pin 3 thereof is connected to pin 4 thereof. In the following description, the pin numbers refer to those connected to the PLL IC 34 as defined by the dash lines in FIG. 2.

A capacitor 42 has one end thereof connected to pin 6 and the other end thereof connected to pin 7. A resistor 44 has one end thereof connected to pin 11 and the other end thereof connected to the ground terminal 38. A resistor 46 has one end thereof connected to pin 13 and the other end thereof connected to pin 9. A resistor 48 has one end thereof connected to pin 9 and the other end thereof connected to one end of a capacitor 50. The other end of the capacitor 50 is connected to the ground terminal 38. A resistor 52 has one end thereof connected to pin 1 and the other end thereof connected to a node 54. A capacitor 56 has one end thereof connected to the node 54 and the other end thereof connected to the ground terminal 38. The resistor 52 and the capacitor 56 provide low pass filtering of the signal on pin 1 of the IC 34.

An internal voltage control oscillator 58 (VCO) has the output terminal thereof connected to pin 4 and the control voltage input thereof connected to pin 9. The VCO 58 has a timing resistor input connected to pin 11 and two timing capacitor inputs connected to pins 6 and 7 respectively. The resistor 44 and the capacitor 42 determine the basic operating frequency of the VCO 58. The control voltage input allows the frequency of the VCO 58 to be varied.

An internal amplifier 60 has the input thereof connected to pin 14 and the output thereof connected to one input of an internal phase comparator 62. The other input of the phase comparator 62 is connected to pin 3. The phase comparator 62 has two outputs, the first of which is connected to pin 13 and the second of which is connected to pin 1. The phase comparator 62 compares the phase between the signal output by the VCO 58 and the signal input on the input terminal 40. The phase information output by the phase comparator 62 is input to a loop filter comprised of the resistors 46 and 48 and the capacitor 50. The signal on pin 9 is an error voltage that adjusts the frequency and phase of the VCO 58 to provide a 0° phase difference between the two inputs to the phase comparator 62. The operation and component values for the phase lock loop IC 34 are more fully described in the IC application note ICAN-601 in the RCA Solid State COS/MOS Integrated Circuit Data Book (1977) number SSD-250.

A Schmidt trigger IC 64 has the input thereof connected to the node 54 and the output thereof connected to an output terminal 66. The Schmidt trigger is of the type CD4046B manufactured by RCA Corporation. When the signal on the node 54 exceeds an internal threshold to the IC 64, the output thereof changes state from low to high. When the signal on the node 54 is lowered and falls below a second threshold internal to the IC 64, the output thereof changes from a logic high to a logic low state. The purpose of the thresholds within the IC 64 is to prevent oscillations when noise causes the signal on the node 54 to momentarily increase slightly above a threshold and then fall below a threshold. With two thresholds, any residual noise must exceed both thresholds to cause oscillations. This provides a certain degree of noise immunity.

Figure 3:
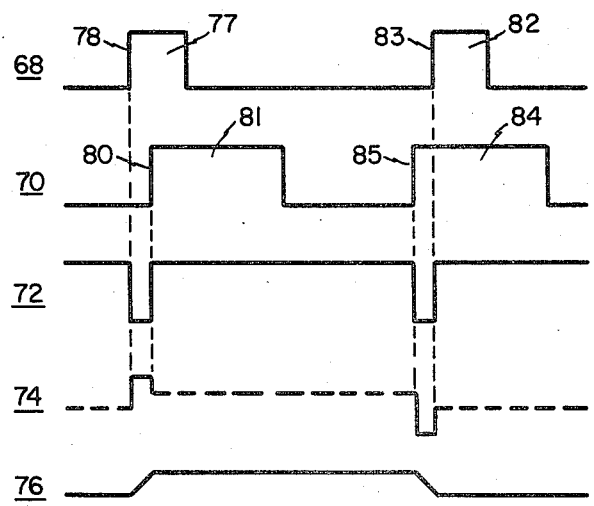
FIG. 3 is a diagram of the waveforms for the circuit of FIG. 2.

Referring now to FIG. 3, the waveforms for the operation of the circuit of FIG. 2 are illustrated. The following description taken in conjunction with the circuit of FIG. 2 will describe the operation thereof. A waveform 68 represents the signal on the output of the amplifier 60. A waveform 70 represents the output waveform of the VCO 58. The waveforms 68 and 70 are unsynchronized, that is, the phase difference between the two waveforms is not constant.

The level of the waveform 68 goes from the level on the ground terminal 38 to the high state which is at the level of the positive voltage terminal 36. The level of the waveform 70 also ranges from a low state equal to the voltage on the terminal 38 to a high state equal to the level on the positive voltage terminal 36.

A waveform 72 represents the output of the phase comparator 62 on the pin 1. The phase comparator 62 is a digital phase comparator and only compares the leading edges of the pulses in the waveforms 68 and 70 and outputs a low state when the phase difference between the leading edges of the pulses therein is other than 0°. A waveform 74 represents the signal on the output of the phase comparator on pin 13. This output is a tri-state output, that is, it is either a logic high, a logic low or it is an open circuit. The dashed lines represent the open circuitor floating condition of the output. A waveform 76 represents the signal on pin 9 of the IC 34 that is input to the VCO 58.

The waveform 68 has a pulse 77 with a leading edge 78 that occurs prior to a leading edge 80 in a pulse 81 in the waveform 70. When the leading edge 78 occurs, the waveform 72 makes a transition from a high state to a low state and the waveform 74 makes a transition to the high state. The waveform 72 remains in the low position and the waveform 74 remains in the high position until the occurrence of the leading edge 80. The waveform 72 then returns to the high state and the waveform 70 is returned to the open circuit state. It should be understood that the trailing edges in the waveforms 68 and 70 do not affect the operation of the phase comparator 62.

The waveform 68 had a second pulse 82 with a leading edge 83 and the waveform 70 has a second pulse 84 with a leading edge 85. The leading edge 85 occurs prior to the leading edge 83. When the leading edge 85 occurs the waveform 72 makes a transition from a high state to a low state and the waveform 74 makes a transition from the open circuit state to the low state. The waveforms 72 and 74 remain in the low state until the leading edge 83 occurs. The waveform 72 then returns to the high state and the waveform 74 returns to the open circuit state. The waveform 74 outputs a signal that is dependent upon whether the leading edge in the waveform 68 or the leading edge of the waveform 70 occurs first whereas the waveform 72 does not recognize which leading edge occurs first. This allows the waveform 72 to output either a high signal for one phase difference or a low signal for the opposite phase difference.

When the waveform 74 makes a transition from an open circuit state to a high state, the signal is filtered by the loop filter comprised of the resistors 46 and 48 and the capacitor 50 to increase the voltage on the input of the VCO 58. This in turn increases the frequency in the VCO 58 until the leading edge 80 occurs. At this point the output of the comparator is open circuited and the voltage is retained on the capacitor 50. Since the input impedance to the VCO is high and the time is normally of a short duration, this voltage remains relatively constant. When the leading edge 85 occurs, the output of the waveform 74 makes a transition from the open circuit state to the low state. The loop filter then integrates this voltage and decreases the frequency of the VCO 58. This continues until the phase difference between the leading edge of the pulses in the waveform 68 and the leading edge of the pulses in the waveform 70 are synchronized, that is, they have a 0° phase difference. At this point the voltage on the line 76 is a constant voltage.

Referring now to FIGS. 1, 2 and 3, the operation of the missing pulse detector 18 will be described in more detail. As the frequency $F_{IN}$ of the frequency source 12 is increased, the input waveform 68 is at a slightly higher frequency than the VCO output waveform 70. This is represented by the leading edges 78 and 80. The leading edge of the pulses of the waveform 68 lead the leading edges of the pulses in the waveform 70 therefore producing a high output on the waveform 74 during the time between the leading edges in the waveform 68 and the leading edges in the waveform 70. For each leading edge in each pulse in the waveforms 68 and 70, the frequency of the VCO 58 is slightly increased. In addition, a narrow negative going pulse is output from the phase comparator 62 on pin 1 as represented by the waveform 72. Depending upon the loop filter time constant, the VCO 58 is responsive or sluggish to the change in the frequency in the waveform 68. If the VCO 58 is responsive, the pulse width on the waveform 72 is narrow whereas if the VCO 58 is slow in responding to the frequency change in the waveform 68, the pulse width of the pulses in the waveform 72 increases. Each of the pulses output by the phase comparator 62 on pin 1 is low pass filtered by the resistors 52 and 56. If the pulse width is of sufficient duration to integrate the capacitor 56 to a level exceeding the threshold of the Schmidt trigger 64, the output thereof goes to a logic high state. This logic high state indicates that the frequency of the waveform 68 is increasing at too high a rate for the operation of the motor drive package 10. This causes the motor drive 22 to shut down the internal motor and begin a restart procedure.

When a false pulse is introduced into the waveform 68, the leading edge of this pulse triggers the comparator 62 and forces the waveform 72 from the high state to the low state. The waveform 72 remains in the low state until a positive going edge of the waveform 70 occurs. Depending upon where in time this transient occurs, the pulse width of the pulse in the waveform 72 can be quite large. If this pulse width exceeds the time required to integrate the capacitor 56 higher than the threshold of the Schmidt trigger 64, the output thereof triggers high. If, on the other hand, a pulse in the waveform 68 is deleted, then the comparator 62 triggers on the leading edge of the waveform 70 without having a subsequent leading edge in the waveform 68 to return the waveform 72 to the high state. This again results in a long pulse width in the waveform 72 which in turn results in the Schmidt trigger 64 maintaining a high logic state on the output thereof.

Whenever the output of the IC 64 is in the high logic state, the inhibit circuit 28 discontinues operation of the motor drive 22. This prevents either an additional pulse from being introduced to the internal synchronous motor of the motor drive 22 that can result in a high current condition or a high acceleration or slew rate applied to the synchronous motor.

In summary, the missing pulse detector circuit 18 provides an independent monitoring capability of a motor drive package that is operable over a wide input frequency range. It both monitors acceleration rate and missing or deleted pulses. Since synchronous motors only run at one speed, excessive acceleration or undesired pulses can cause deviations from the speed-torque curve. By monitoring the circuit and inhibiting the operation of the synchronous motor when either of these conditions occur, the motor itself can be protected.

Although the preferred embodiment of the invention has been described in detail, it should be understood that various changes, substitutions and alterations can be made therein without departing from the spirit and scope of the invention as defined by the appended claims.

We claim:

1. A method for terminating operation of a synchronous motor upon detecting excessive acceleration, missing pulses and undesired pulses in the synchronous motor which is an integral part of a phase lock loop that is referenced to a driving frequency source, comprising:
   receiving an input signal which is the output of the driving frequency source and having a frequency corresponding to the synchronous speed of the motor;
   generating a variable frequency reference signal;
   adjusting the phase and frequency of the reference signal to provide a constant phase difference between the reference signal and the input signal;

comparing the phase of the input signal to the phase of the reference signal to provide a phase difference signal when the phase between the input and reference signals deviates from the constant phase difference;

outputting a control signal after the difference signal has been present for a predetermined duration of time wherein excessive acceleration results in the presence of the control signal and a missing or undesired pulse also results in the presence of the control signal; and inhibiting operation of the synchronous motor in response to the presence of the control signal.

2. The method of claim 1 wherein the steps of adjusting the phase comprises:

comparing the phase of the input signal and the phase of the reference signal to provide a phase error signal; and filtering the phase error signal to provide a control signal that adjusts the phase and the frequency of the reference signal.

3. The method of claim 1 wherein the step of adjusting the phase comprises:

comparing the phase of the input signal to the phase of the reference signal to provide a phase error signal; and filtering the phase error signal to provide a control signal that adjusts the phase and the frequency of the reference signal to provide a 0° phase difference.

4. The method of claim 1 wherein the step of outputting comprises low pass filtering the phase difference signal to provide a delayed signal that is input to a Schmidt trigger and outputting the control signal from the Schmidt trigger when the delayed signal exceeds an internal threshold off the Schmidt trigger.

5. A method for terminating operation of a synchronous motor upon detecting excessive acceleration, missing pulses and undesired pulses in the synchronous motor which is an integral part of a phase lock loop that is referenced to a driving frequency source, comprising:

receiving an input signal which is the output of the driving frequency source and having a frequency corresponding to the synchronous speed of the motor;

generating a voltage controlled variable frequency reference signal;

comparing the phase of the reference signal to the phase of the input signal to provide a phase error voltage signal that controls the phase and frequency of the reference signal to maintain a constant phase difference therebetween;

comparing the phase of the input signal to the phase of the reference signal to provide a phase difference signal when the phase difference between the input and reference signals deviates from the constant phase difference;

outputting a control signal after the phase difference signal has been present for a predetermined duration of time wherein excessive acceleration results in the presence of the control signal and a missing or undesired pulse also results in the presence of the control signal; and stopping operation of the synchronous motor in response to the presence of the control signal.

6. The method of claim 5 wherein the step of providing a phase error signal comprises:

comparing the phase of the reference signal to the phase of the input signal to provide a variable width pulse waveform having a pulse width equal to the phase difference between the reference signal and the input signal; and filtering the variable width pulse waveform to provide the phase error signal.

7. The method of claim 5 wherein the step of outputting the control signal comprises:

low pass filtering the phase difference signal; and triggering a Schmidt trigger when the output of the low pass filter exceeds the internal threshold of the Schmidt trigger.

8. A circuit for terminating operation of a synchronous motor upon detecting excessive acceleration, missing pulses and undesired pulses in a synchronous motor which is an integral part of a phase lock loop that is referenced to a driving frequency source, comprising:

means for receiving an input signal which is the output of the driving frequency source and having a frequency corresponding to the synchronous speed of the motor;

means for generating a variable frequency reference signal;

means for adjusting the phase and frequency of said reference signal to provide a constant phase difference between the reference signal and the input signal;

means for comparing the phase of said input signal and said reference signal to provide a phase difference signal when the phase between said input and reference signals deviate from said constant phase difference;

means for outputting a control signal after said difference signal has been present for a predetermined duration of time wherein excessive acceleration results in the presence of said output signal and a missing pulse or an undesired pulse also results in the presence of said output signal; and means for inhibiting operation of the synchronous motor in response to the presence of said control signal.

9. The circuit of claim 8 wherein said means for generating comprises a voltage controlled oscillator.

10. The circuit of claim 8 wherein said means for adjusting comprises:

a phase comparator having a first and second input, the first input for receiving said reference signal and the second input for receiving said input signal; and a loop filter for filtering the output of said phase comparator to provide a control signal for controlling the frequency of said reference signal in response to the phase difference between said reference signal and said input signal.

11. The circuit of claim 8 wherein said means for outputting said control signal comprises:

a low pass filter for filtering the phase difference signal; and a Schmidt trigger for receiving the output of said low pass filter, said Schmidt trigger having a predetermined internal threshold that triggers the output thereof to a high logic state when the output of said low pass filter exceeds said threshold and a low logic state when the output of said low pass filter is below said threshold.

12. A circuit for terminating operation of a synchronous motor upon detecting excessive acceleration, missing pulses and undesired pulses in the synchronous motor, the synchronous motor being an integral part of a phase lock loop referenced to a driving frequency source, comprising:

means for receiving an input signal which is the output of the driving frequency source and having a frequency corresponding to the synchronous speed of the motor;

means for generating a reference signal having a voltage controlled frequency;

first means for comparing the phase of said reference signal to the phase of said input signal to provide a phase error voltage signal that controls the phase and frequency of said reference signal to maintain a constant phase difference between said reference signal and said input signal;

second means for comparing the phase of said reference signal to the phase of said input signal to provide a phase difference signal when the phase difference between the input signal and reference signals deviates from said constant phase difference, said phase difference signal not controlling said generating means;

a low pass filter for receiving said phase difference signal;

a Schmidt trigger for receiving the output of said low pass filter, said Schmidt trigger having an internal threshold and an output having a low logic state and a high logic state wherein the output of said Schmidt trigger is in the high logic state when the output of said low pass filter exceeds said internal threshold in response to the presence of said phase difference signal and the output of said Schmidt trigger is in the low logic state when the output of said low pass filter is below said threshold in response to the absence of the phase difference signal; and means for terminating operation of the synchronous motor in response to the output of the Schmidt trigger changing states from the low logic state to the high logic state.

13. The circuit of claim 12 wherein said means for generating comprises a voltage controlled oscillator.

14. The circuit of claim 12 wherein said first means for comparing comprises:

a phase comparator having a first and second input and an output, the first input thereof for receiving said input signal, the second input thereof for receiving said reference signal and the output thereof for outputting a pulse having a width proportional to the phase difference between said reference and input signals; and a low pass filter for filtering the output of said phase detector to provide said phase error signal.

15. The circuit of claim 12 wherein said second means for comparing comprises a phase comparator having a first and second input and an output, the first input thereof for receiving said input signal, the second input thereof for receiving said reference signal and the output thereof for outputting a pulse having a width proportional to the phase difference between the zero crossing point of said input signal and the zero crossing point of said reference signal.

* * * * *